United States Patent [19]

Dolkas et al.

[11] Patent Number: 5,007,051
[45] Date of Patent: Apr. 9, 1991

[54] LINK LAYER PROTOCOL AND APPARATUS FOR DATA COMMUNICATION

[75] Inventors: Gregory D. Dolkas, Auburn; William R. Martin, Roseville, both of Calif.

[73] Assignee: Hewlett-Packard Company, Palo Alto, Calif.

[21] Appl. No.: 319,897

[22] Filed: Mar. 3, 1989

Related U.S. Application Data

[63] Continuation of Ser. No. 103,485, Sep. 30, 1987, abandoned.

[51] Int. Cl.[5] .............................................. H04L 5/22
[52] U.S. Cl. .................................. 370/85.1; 370/110.1
[58] Field of Search ...................... 370/60, 85, 94, 99, 370/85.1, 94.1, 110.1; 371/32, 33

[56] References Cited

U.S. PATENT DOCUMENTS

| | | | |
|---|---|---|---|
| 4,445,214 | 4/1984 | Reynolds et al. | 370/94 |
| 4,597,074 | 6/1986 | Demichelis et al. | 370/85 |
| 4,639,910 | 1/1987 | Toegel et al. | 370/85 |
| 4,720,828 | 1/1988 | Jones | 370/94 |
| 4,727,538 | 2/1988 | Furchtgott et al. | 370/85 |
| 4,791,639 | 12/1988 | Afheldt et al. | 370/110.1 |
| 4,799,215 | 1/1989 | Suzuki | 370/94 |
| 4,841,526 | 6/1989 | Wilson et al. | 371/32 |

OTHER PUBLICATIONS

*IEEE Standards for Local Area Networks=Logical Link Control*, ANSI/IEEE Std. 802.2-1985, pp. 68-77.

*Primary Examiner*—Douglas W. Olms
*Assistant Examiner*—Melvin Marcelo

[57] ABSTRACT

A method and device for controlling the transmission across a data link is disclosed. Link Layer protocol formatting in a variation on a "sliding window" protocol is implemented. In data communication equipment, a protocol controller device is described, coupling a first input/output means, for coupling to a local data terminal equipment, to a second input/output means, for coupling said local data terminal equipment to a communication link, comprising: first porting means for transferring information in to and out from said first input/output means; second porting means for transferring said information to and from said second input/output means; switching means coupled to said first porting means for controlling an input/output information transfer path through said porting means; information holding means, coupled to said first porting means and to said second porting means, for pipelining said information through said device; and controlling means, coupled to said holding means and said second porting means, for protocol formatting of said information. The present invention includes a method for controlling data transmission using an open systems interconnection model, comprising: providing link layer sliding window protocol formatting of information to be transmitted such that said protocol provides transmission error control; and providing link layer sliding window protocol formatting of information to be transmitted such that said protocol provides transmission flow control and fully decoded control information.

12 Claims, 13 Drawing Sheets

OSI DATA ENCAPSULATION/PASSING BY LAYERS

INFORMATION FRAMES:
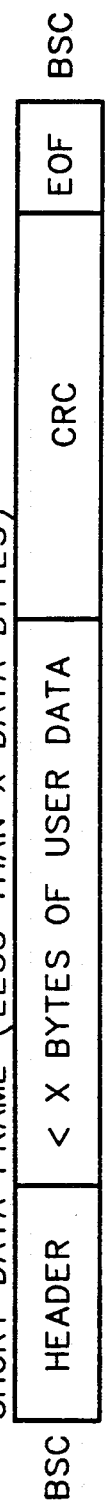
FIG 5A (PRIOR ART)
CONTROL FRAMES:
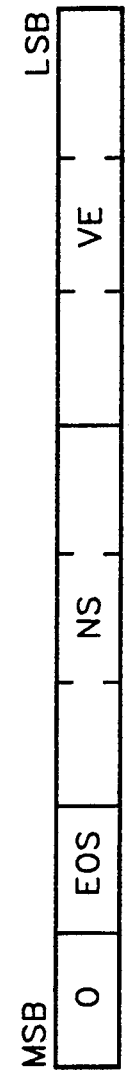
FIG 5B (PRIOR ART)
FIG 5C (PRIOR ART)
FIG 5D
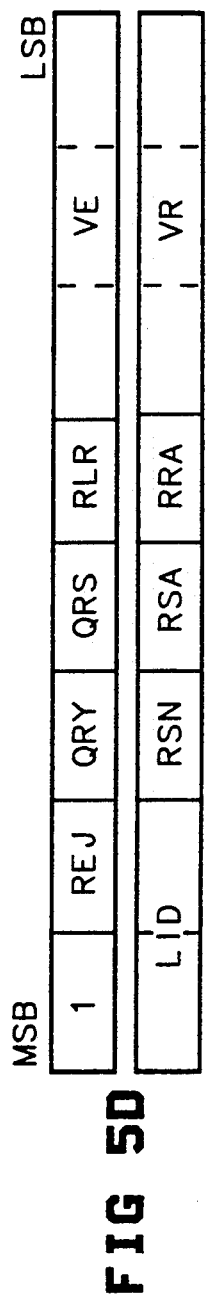

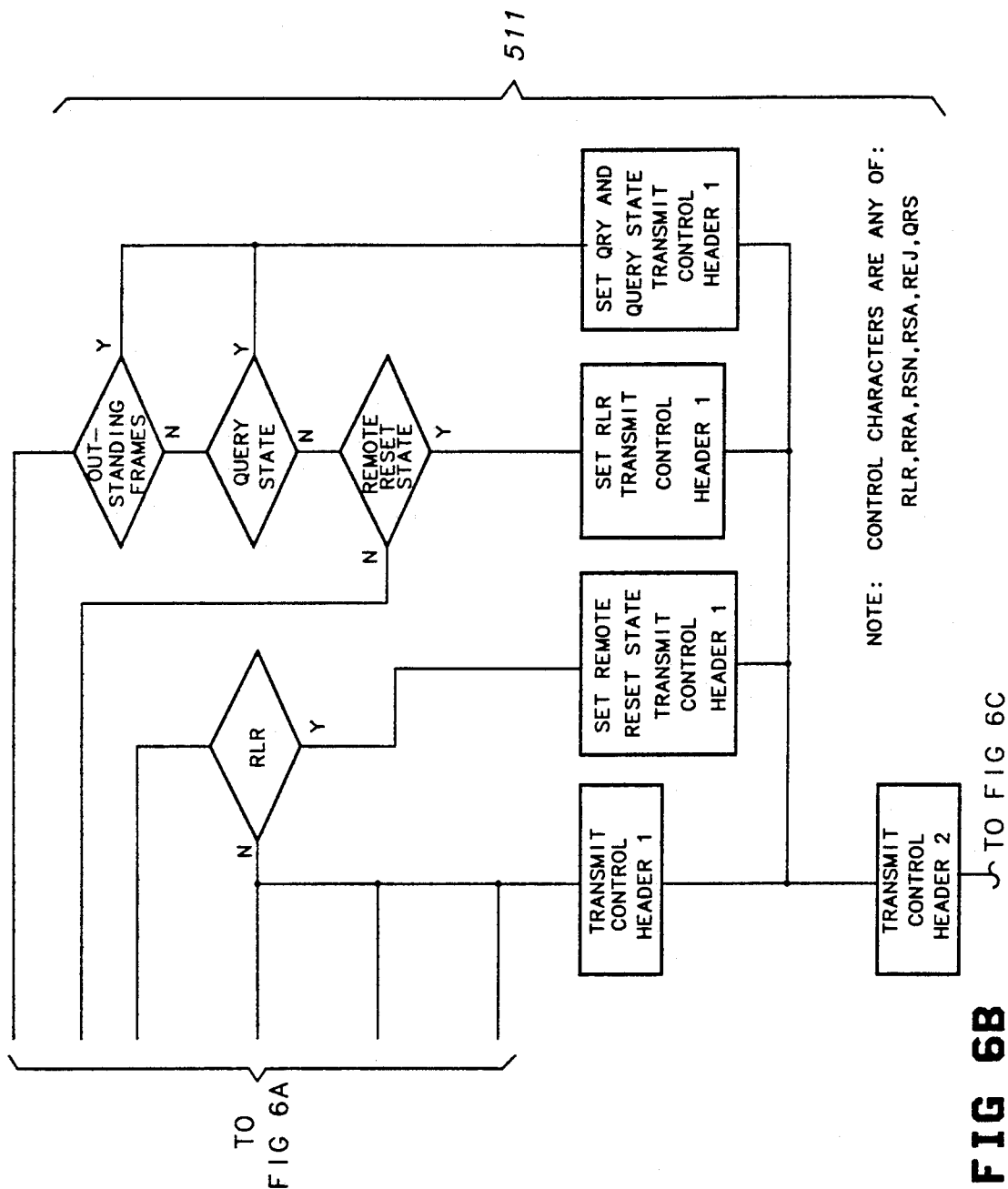

LINK LAYER PROTOCOL AND APPARATUS FOR DATA COMMUNICATION

This application is a continuation of application Ser. No. 07/103,485, filed Sept. 30, 1987, now abandoned.

BACKGROUND OF THE INVENTION

1. Field of the Invention

The present invention generally relates to data communications, such as local area networks (LAN) and, more particularly, to a method and apparatus for controlling the transmission across a data link.

2. Description of the Related Art

In general, there are a variety of basic mechanisms for transmitting information between two or more information source/sink devices (referred to in the art as data terminal equipment or DTE) on a particular data link. However, in order to ensure the reliable exchange (i.e. to a high probability free of errors and duplications) of meaningful messages between any two DTEs in a data link, it is necessary to define a set of rules, or control procedures, which must be adopted by all the communicating nodes. These rules or procedures are commonly known as communication protocols.

In order to insure compatible development throughout the industry, standards have been set for basic DTE operational specifications, e.g. IEEE 802.3, Carrier Sense, Multiple Access with Collision Detection (CSMA/CD) for LANs. This is the basic data packet standard (where a "packet" is a self-contained message unit comprising information less than the entire message being sent). This standard is used to control access to a shared transmission medium such as a coaxial cable bus to which a number of DTE stations are connected.

The physical transfer is accomplished by data buffering, where anywhere from approximately 128 to 4096 bytes may be buffered (the physical media may limit the maximum, e.g. Ethernet/IEEE 802.3 is limited to 1514 bytes per transferred data field).

In designing communication equipment, there are trade-offs. Larger buffers increase efficiency but smaller buffers require less memory hardware. In practice, smaller buffers may have higher throughput even if the error rate is high, since less data has to be retransmitted to recover from a bad packet.

There are different types of packets. Some contain control information; others contain user data.

Packets, in turn, have different parts. Delimiters mark the start and end of a packet, framing the packet. They are also used to synchronize the transmitter and receiver sections of the DTEs on the link. Frame structure is concerned with defining each unit of information transferred across a data link. Typically there are control frames (C-FRAMES) for link management and information frames (I-FRAMES) for the transfer of user's message data. Typical information frames and control frames are shown in FIGS. 5a and 5b, respectively. The header at the beginning of a packet identifies the type of packet information, viz, control or data. Data packets contain the user's data (as opposed to data which the protocol understands). Control packets relate to information established by the protocol.

Protocols are generally organized into layers, each layer operating more or less independently. For example, in the open systems interconnection (OSI) model of the International Standards Organization, a seven layer standard, shown in FIG. 1, has been adopted to make multi-vendor networking products easier to accomplish. The types of frames and messages used by each layer vary since they each perform different and complementary functions. For example, higher level software layers communicate over the link by exchanging messages using the resources provided by lower layers. Link Layer protocol is concerned with providing reliable transmission on the data link, viz., providing a reliable transport facility across the physical transmission media link between DTEs. Important components of a Link Level protocol are connection management, error control and flow control.

Error control is concerned with both error detection and correction. The quantum of recovery is a packet. Error detection is usually determined by using a Cyclic Redundancy Check (CRC in FIGS. 5a and 5b), a numeric value computed from the data in the message transmitted which is compared to the value generated from the data received. Error recovery is achieved by rejection of the bad packet by the receiving DTE node on the link and retransmission from the transmitting DTE node on the link.

Flow control is concerned with controlling the rate of transmission of elements—characters or frames of characters—on a link. Transmission and reception are generally asynchronous processes. Therefore, flow control is necessary so that the receiver always has sufficient buffer storage resources to accept each element sent to it, i.e. to prevent the transmitter from overrunning the receiver. The common means for achieving flow control is by using "start" and "stop" control messages.

In general, a Link Layer protocol can be considered as being concerned with several intricacies of communicating over a link: first, with the intial setting up of the link to ensure both parties are ready to exchange information, second, with the ordered exchange of data blocks or messages across the link, and third, with the orderly release or clearing of the link. The present invention relates to the first and second. A number of control messages are needed to perform the various functions.

One common type of Link Layer protocol for bidirectional transmission on a link is commonly known as the sliding window protocol. The essence of all sliding window protocols is that at any instant of time, the transmitting node maintains a list of consecutive sequence numbers corresponding to frames it is permitted to send. These frames are said to fall within the sending window. Similarly, the receiving node also maintains a receiving window corresponding to frames it is permitted to accept. The protocol is required to deliver the messages to the destination DTE in the same order they were passed from the source DTE. Since frames currently within the sender's window may ultimately be lost or damaged in transit, the sender must keep all these frames in its memory for possible retransmission. Thus, the sequence numbers of the transmitted frames within the sender's window represent frames sent but not acknowledged. Whenever a new message arrives from the host DTE, it is given the next highest sequence number, and the upper edge of the sender's window is advanced by one. When an acknowledgement comes in, the lower edge is advanced by one. In this way the sender's window continuously maintains a list of unacknowledged frames. The receiver's window corresponds to the frames it may accept. When a frame whose sequence number is equal to the lower edge of the window is received, it is passed to the host receiving DTE, an acknowledgement is generated, and the window is rotated by one. For additional detail on sliding window protocol, reference to a text such as COMPUTER NETWORKS, A. S. Tanenbaum, copyright 1981, Prentice-Hall, Inc., Chap. 4.2, is recommended.

Known data link protocols assume that a data packet of a particular sequence number is available for re-use (i.e. receiver buffer space is available) when the data have been acknowledged. However, when data rates are high compared to the total amount of buffer space, this often is not the case, causing "stop" and "start" packets to be sent excessively. At very high speeds, a "stop" packet may not arrive in time. Therefore, one or more packets will be lost at the receiving DTE for lack of buffer space. An error recovery mechanism would then have to be used to recover the data. This wastes time and link bandwidth.

In prior art protocols, large numbers of buffers are often required, prohibiting one-chip integrated circuit solutions. Packet headers are very complex, using encoded fields to transmit each individual control instruction. Thus, decoding is complex, requiring complex hardware.

Other problems also occur due to the nature of the physical transmission media, e.g., two-wire open lines, twisted pair lines, coaxial cables, and optical fibers.

Hence, there is a need to improve the reliability of the data packets in data links. Additionally, there is a need to provide a communication protocol which works effectively at high speed transmission rates.

SUMMARY OF THE INVENTION

The present invention relates to a component of a data communication equipment (DCE)—for example, a backplane input—output adapter—which establishes and maintains Link Level protocol for the local DTE coupled to a communication link through the adapter.

Generally, the present invention provides a method and apparatus for improving the performance of the data flow in a high speed data link.

It is an advantage of the present invention that it provides a method for the high speed (e.g., 100 megabits per second) transporting of data, which is compatible with the transmission rates associated with fiber optic transmission media and suitable for implementation in a single integrated circuit device.

By changing the protocol format to one which shortens the length of data within an information packet, the present invention provides an advantage of allowing implementation in a single integrated circuit chip, hence, lowering the cost of a link connection and increasing its mean time between failure (MTBF).

Yet a further advantage of the present invention is that full error detection and correction and flow control are provided at the Link Layer level.

A further advantage of the present invention is that it provides simultaneous bidirectional communication.

Another advantage of the present invention is that it provides continuous, bidirectional flow of information frames without requiring an interrupt to send flow control frames.

Another advantage of the present invention is that it provides data link error and flow control on a single integrated circuit chip using relatively small buffers.

Still another advantage of the present invention is that it provides flow and error control frames, using instruction bits in said frames (rather than requiring separate frames for each control instruction) and operating as headers in both I-FRAMES and C-FRAMES.

In a basic aspect, the present invention includes a method for controlling data transmission using an open systems interconnection model, comprising: providing link layer sliding window protocol formatting of information to be transmitted such that said protocol provides transmission flow control.

In another basic aspect, the present invention provides in data communication equipment, a protocol controller device coupling a first input/output means, for coupling to a local data terminal equipment, to a second input/output means, for coupling said local data terminal equipment to a communication link, comprising: first porting means for transferring information in to and out from said first input/output means; second porting means for transferring said information to and from said second input/output means; switching means coupled to said first porting means for controlling an input/output information transfer path through said porting means; information holding means, coupled to said first porting means and to said second porting means, for pipelining said information through said device; and controlling means, coupled to said holding means and said second porting means, for protocol formatting of said information.

Other features and advantages of the present invention will become apparent upon consideration of the following detailed description and the accompanying drawings, in which like reference designations represent like features throughout the FIGURES.

BRIEF DESCRIPTION OF THE DRAWINGS

FIGS. 5a-5d are depictions of transmission frames in which:

FIG. 5a (prior art) is a depiction of two formats of information data frames in a communication link flow pattern such as shown in FIG. 2;

FIG. 5b (prior art) is a depiction of a control data frame as may be found in a communication link flow pattern such as shown in FIG. 2;

FIG. 5c is a depiction of an information data frame header according to the method of the present invention;

FIG. 5d is a depiction of a control data frame header according to the method of the present invention.

FIG. 6a-6c is a flow chart representation according to the present invention of a state machine for establishing data flow in the TRANSMIT mode.

FIG. 8b is a depiction of an example of ACKNOWLEDGE state variable buffer region pointer operation as shown in FIG. 8a.

Figure 1:
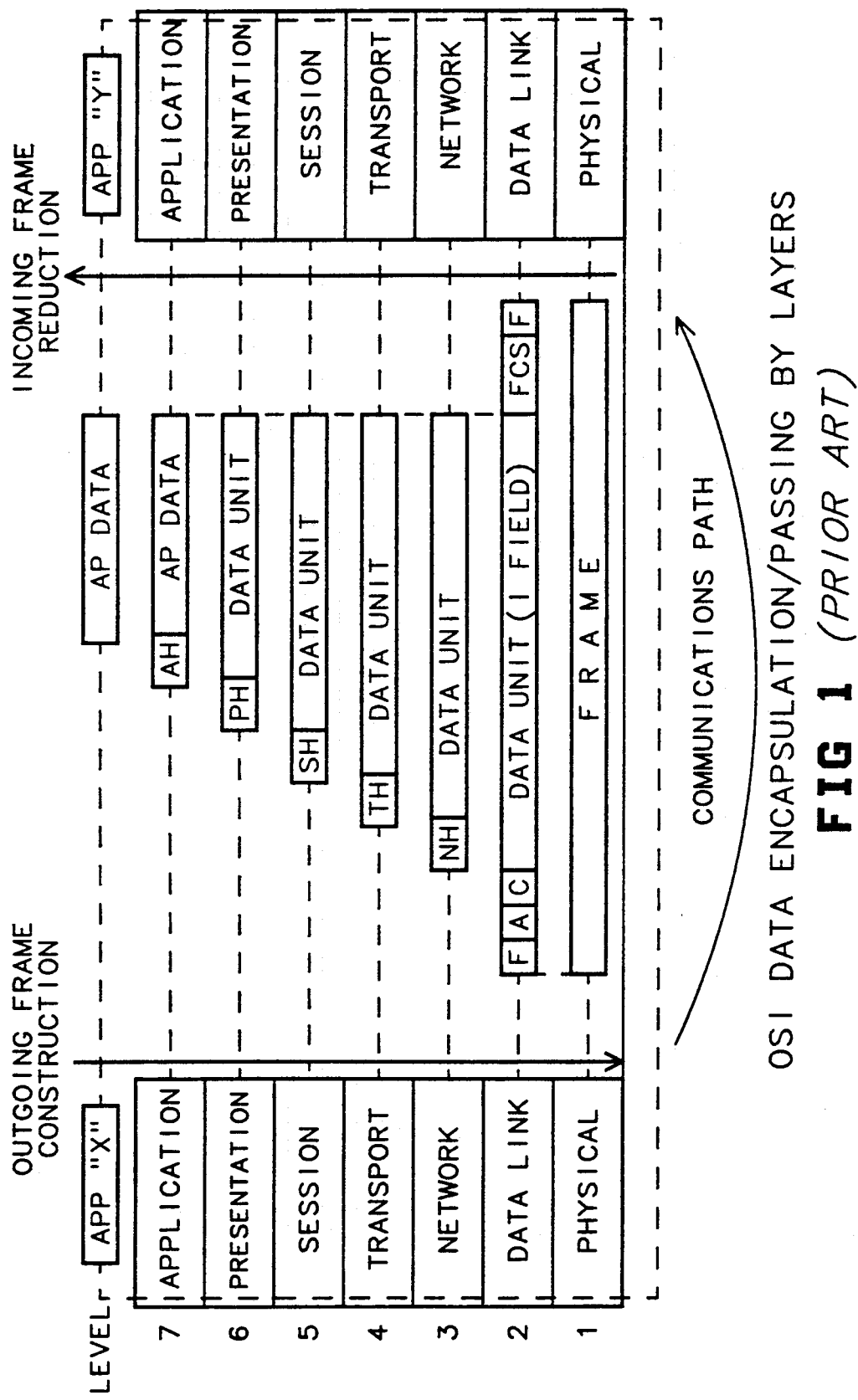
FIG. 1 (prior art) is a depiction of the OSI data encapsulation protocol standard.

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventors for practicing the invention. Alternative embodiments are also briefly described as applicable. It is contemplated by the inventors that the apparatus may be constructed in integrated circuit (IC) form and, more specifically, as a single IC chip. As such, however, a detailed description of the particular circuitry or process technology in an IC implementation is not necessary to an understanding of the inventive concept disclosed herein.

A glossary of terms, including a summary of the TRANSMIT MODE and RECEIVE MODE state variables defined for this description of the present invention, is shown in TABLE 1:

TABLE I

| | |
|---|---|
| BSC | Byte Synchronization Character. |
| CDAV | Control Port Data Available. |
| CRC | Cyclic Redundancy Check. A numeric value computed from the bits in the message to be transmitted; used for the detection of errors. |
| DDAV | Receive Buffer Data Available. |
| DMA | Direct Memory Access. |
| DRFD | Transmit Buffer Ready. |
| DEVRDY | Device Ready/Data Acknowledge. |
| EOF | End of Frame. Physical Link Layer control symbol. |
| EOS | End of Segment. Indicates the current I-frame is the last of a Network Layer 3 packet. |
| EN | Enable DMA. |
| IDL | Idle Character. |
| LID | Link ID. Reserved for future link identification, must be zero. |
| NS | Send Sequence Number. The current value of the send variable, VS; i.e., the sequence number of this I-frame. |
| NE | Empty Sequence Number. The current value of the (to-) empty variable, VE; i.e., the sequence number of the next frame to be removed (emptied) from the receive buffer. |
| NR | Receive Sequence Number. The current value of the receive variable, VR; i.e., the sequence number of the next frame expected by the receiver. |
| QRY | Query. The transmitting node has timed out waiting for a previously transmitted frame to be acknowledged. |
| QRS | Query Response. Marks this frame as the response to a previous query. |
| REJ | Reject. Indicates that a frame was received out-of-sequence, i.e., NS of the received frame did not equal VR. |
| RLR | Remote Link Reset. Causes a pulse to be genered on the RLR pin of the protocol chip. |
| RRA | Remote Reset Acknowledge. Acknowledges the receipt of an RLR. |
| RSN | Resynchronize. Re-initiates the link. |
| RSA | Resync Acknowledge. Acknowledges RSN. |
| RST | Reset to the protocol controller chip. |
| RTS | Request to Send. |
| RTR | Ready to Receive. |
| RX | Device Receive. |
| For the Transmitter | |
| VS | Send State Variable. Points to the next I-frame to be transmitted. |
| VA | Acknowledge State Variable. Points to the next I-frame to be acknowledged by the remote. |
| VW | Window State Variable. Points to the next I-frame to be removed from the transmitter's window. |
| VF | Fill State Variable. Points to the next I-frame that may be filled by the transmitter DMA (when TX_F(VF) = 0). |
| For the Receiver | |
| VR | Receive State Variable. Points to the next I-frame to be received from the remote (currently empty). |
| VE | Empty State Variable. Points to the next I-frame to be emptied by the receiver DMA. |
| These state variables are related as follows (all math modulo 8): | |
| VA <= VS | Frames VA through, but not including, VS have been sent and not yet acknowledged. |
| VW <= VA | Frames VW through, but not including, VA have been acknowledged by the remote host, but have not been emptied by the remote yet. |
| VF <= VA | Frames VF through, but not including, VA have been received, acknowledged, and emptied by the remote, are available for re-filing by the local host. |
| VE <= VR | Frames VE through, but not including, VR have been received, and are ready to be emptied into the host. |
| TX_FULL(Vx) | Full. Indicates the buffer contains data. |
| SENT(Vx) | Sent. Indicates the buffer has been sent, but not acknowledged. |
| TX_EOS(Vx) | End-of-Segment. Indicates this is the last frame of a Network Layer 3message segment. |
| TX_CNTR(Vx) | Transmit Counter. Indicates the number of bytes in the buffer (if any) in excess-1 notation (O..F. = 1..16). |

TABLE I-continued

| | |
|---|---|
| RX_FULL(Vx) | Full. Inciates the buffer contains data. |
| RX_EOS(Vx) | End-of-Segment. Indicates the EOS bit in the header of the received frame was true. |
| RX_CNTR(Vx) | Receive Counter. Indicates the number of bytes in the buffer (if any), in excess-1 notation (O..f = 1..16). |
| RJS bit | Reject State. A reject frame has been sent. |
| QS bit | Query State. A query frame has been sent. |
| RSS bit | Re-sync State. A re-sync frame has been sent. |
| RRS bit | Remote Reset State. A remote reset frame has been sent. |
| TXTO Counter | Transmit Timeout. A re-startable acknowledge timer. |

GENERAL DESCRIPTION OF THE APPARATUS

Figure 2:
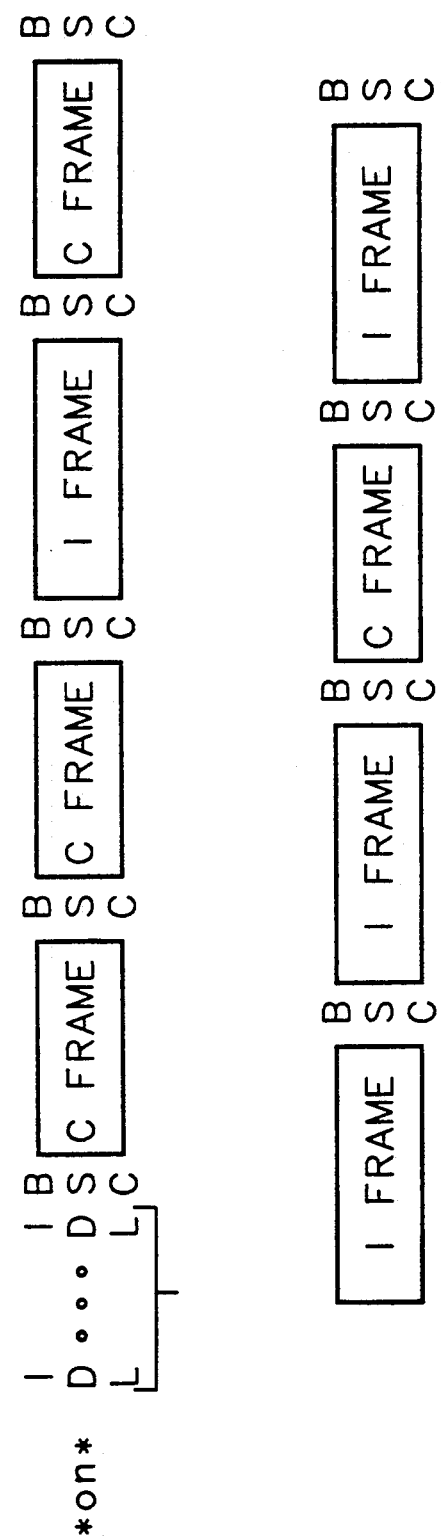
FIG. 2 is a depiction of a typical pattern of a stream of information flow on a communication link as implemented in accordance with the present invention.

A typical flow of information across a link in accordance with the present invention is shown in FIG. 2. When coming on-line, after either a power cycle or running a self test, an idle symbol (IDL) is sent to assist in gaining clock synchronization between DTEs. Next, and alternatively between each frame, a byte synchronization character (BSC) symbols is sent across the link to thereafter allow the receiver to retain or regain synchronization even in the presence of link induced errors.

Figure 3:
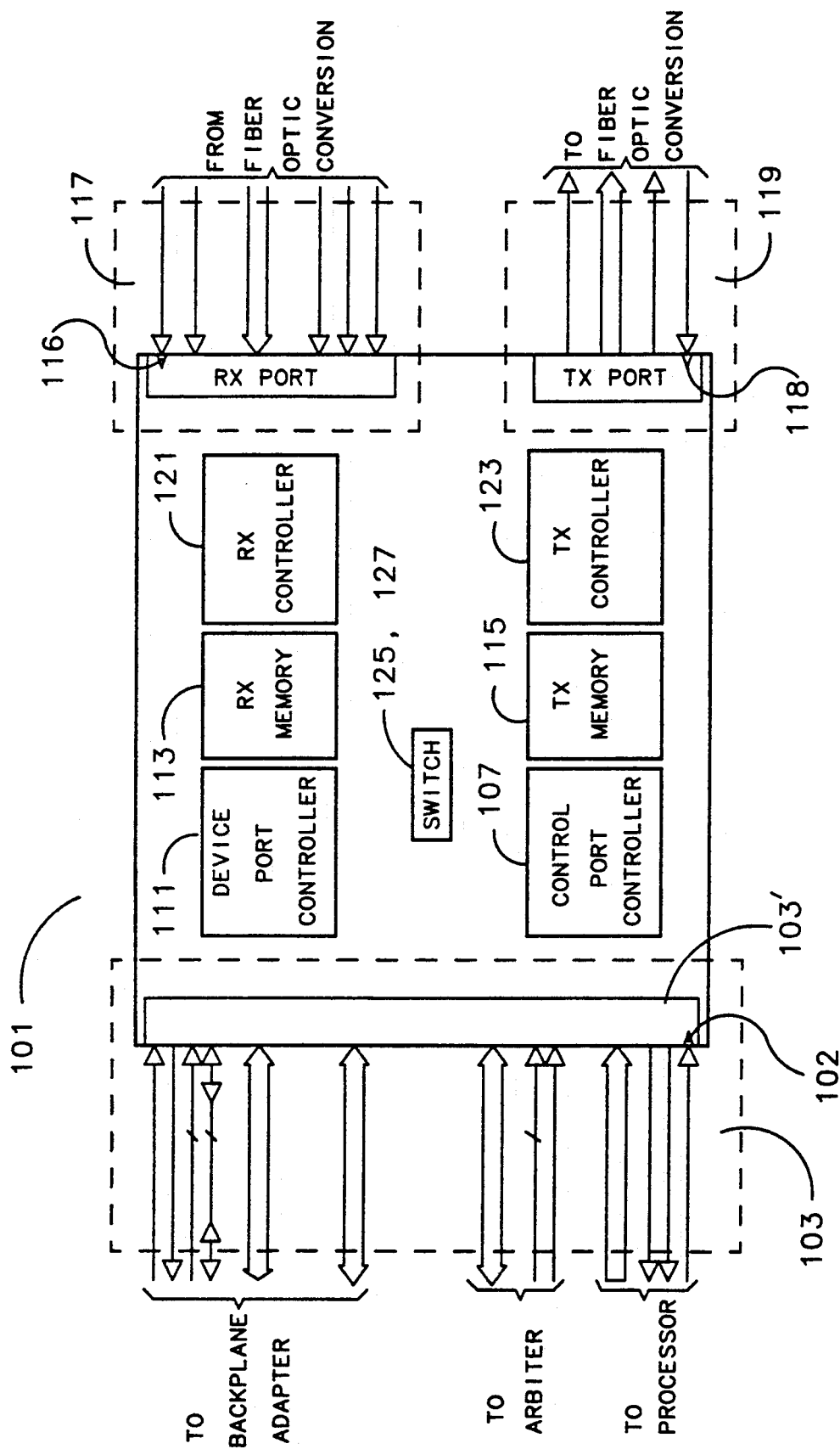
FIG. 3 is a schematic block diagram depicting the overall structure of the apparatus of the present invention.

Referring to FIG. 3, the device 101 (referred to hereinafter as protocol controller 101), is responsible for transforming data to and from the Link Layer protocol format.

The protocol controller 101 can be one component of an input-output (I/O) card device for a computer in which it couples input/output bus backplane adapter and microprocessor components (not shown), which receive information from a local host DTE, to an output component (not shown), such as a parallel-to-serial converter (PSC), which is coupled to the communication link. As a preferred embodiment described herein, the protocol controller 101 is presented as part of a I/O card coupling a local host DTE to a fiber optic communication link (not shown). In order to describe the features and operation of the invention, it is assumed that an identical, or compatible, data communication equipment having a substantially compatible adapter is available at a remote node on the link. It is not the intent of the inventors that the scope of the invention be limited by this example.

The protocol controller 101 establishes and maintains Link Level protocol for the DTE which is coupled to a communication link through the I/O card. The actual protocol control takes place in the management of data that are sent and received by the protocol controller 101. The protocol formatting is a variation on a Link Layer "sliding-window" protocol.

Four bidirectional input/output (I/O) port controllers, CONTrol 107, DEVice 111, Receive (RX) 121 and Transmit (TX) 123, provide bidirectional capability through the ports 103, 117, 119. In the present embodiment, the protocol controller 101 provides both a half-duplex and full-duplex interface. Data to be transformed to the protocol format by the protocol controller 101 and then transmitted is received via a bus from another system component, such as an I/O bus adapter device (not shown). A control port controller 107 is used, such as by a related processor component (not shown), to access control registers and to transfer data to and from the link, in this embodiment, for example, via the RX port 117 and the TX port 119 coupled to a fiber optic conversion unit. The control port controller 107 comprises registers and a programmable logic array used to control and monitor the behavior of the link and data transfers active on it. Some error conditions and recovery measures are managed through this path. Data transfers via the control port controller 107 usually consist of header messages (described in detail hereinafter)—viz. those used to setup and execute data transfers between a local I/O card or DTE and a complementary remote device—which would follow the Network Layer 3 protocol as shown in FIG. 1. Timing control is specific to each commercial embodiment designed. Hence, only general reference will be given throughout this description.

The device port controller 111 establishes a high speed direct access port which handles the majority of the I/O traffic on the link. It provides a direct data path to inbound, RX, or outbound, TX, memory components 113, 115, depending upon the direction of the data transfer. Status indicators are provided via the port 103 to indicate whether the device port controller 111 is ready to send or receive data as well as to identify when a particular stream of data has reached a termination condition. Again, timing is device specific.

In the preferred embodiment, the control port controller 107 and device port controller 111 can be implemented as a single register 103' controlled by the microprocessor.

Both the paths for inbound link data, RX DATA from the RX port 117, and outbound link data, TX DATA to the TX port 119, contain memory, in the present embodiment, an addressable first-in, first-out (FIFO) memory component 113, 115, respectively.

In the case of data in the outbound (TX memory) FIFO 115, the protocol controller 101 must guarantee that any data (TX data) loaded into the FIFO 115 will not be overwritten until it has been correctly received by the remote node device on the link and, furthermore, that the inbound FIFO of the remote node controller (not shown) will not be overrun.

For inbound data, RX DATA from the RX port 117, the protocol controller 101 must guarantee that all data have been received in the order it was loaded into the remote node's outbound FIFO and that any attempts at overrun will generate a protocol error.

A receive port controller 121 takes parallel data from the RX port 117, processes it, verifies its integrity, and then extracts the protocol Link Layer 2 information from it. Valid data extracted from I-FRAMES—consisting of formatted buffers obtained from the outbound FIFO 115, involving prefacing the buffer of data with an information header which identifies the particular buffer to be sent and then appending a CRC to the buffer to protect the data buffer's content—are loaded into the inbound FIFO 113. Remote node state information is extracted from I-FRAMES and C-FRAMES—containing the current state of the inbound FIFO 113 as well as link control commands—and directs behavior of a transmit port controller 123. In the present embodiment, the receive port controller 121 also monitors the state of the fiber optic converter unit's receiver and provides this information to the related microprocessor via the control port controller 107.

The transmit port controller 123 is used by the protocol controller 101 to send data from the outbound FIFO 115 to the link via the TX port 119 to the fiber optic converter unit's transmitter. It also supplies state information to the remote node to allow management of the link via the Link Layer 2 protocol. Data and state information are packaged in the I-FRAMES and C-FRAMES, respectively.

Two main factors influence whether the protocol controller 101 will send an I-FRAME out of the transmit port: (1) the ability of the remote node to accept another buffer, and (2) the presence of a buffer to be sent. The protocol controller 101 must determine the state of the remote node's inbound FIFO from data received through the receive port controller 121. C-FRAMEs are sent if the protocol controller 101 is incapable of currently sending an I-FRAME. Acknowledgement of outstanding buffers and transmission retry is also caused by examination of the state of the remote node's inbound FIFO by the transmit port controller 123.

A special feature of the present embodiment are switch components 125, 127. These switch components 125, 127 allow the inbound and outbound data paths to be either manually or automatically pointed to the device port controller 111 or the control port controller 107. Each FIFO 113, 115 has its own independent switch 125, 127, respectively. When the switches 125, 127 are manually operated, an associated processor explicitly can establish the connection to the I/O data paths by pointing the switch to one of the port controllers 107, 111. In an automatic mode, each switch 125, 127 toggles between the control port controller 107 and device port controller 111, depending upon information previously loaded into the control port controller register 103. The switch feature only affects data transfer paths; it does not inhibit control port controller register 103 accesses.

Timing control can be implemented by generating two internal, non-overlapping clock signals using an external system clock inputs 102. Another external clock input 118 signal is used for TRANSMIT MODE of operation. Still another external clock input signal 116 is used for RECEIVE MODE of operation. Some signals must provide communication between the RECEIVE and TRANSMIT clock domains. To accomplish this, these signals are first synchronized to the system clock domain signal 102 and then to the TRANSMIT clock domain 118. In the preferred embodiment, the internal system clock frequency is twice that of the external system clock input 102, allowing four clock phases to be generated per external system clock cycle.

Figure 4:
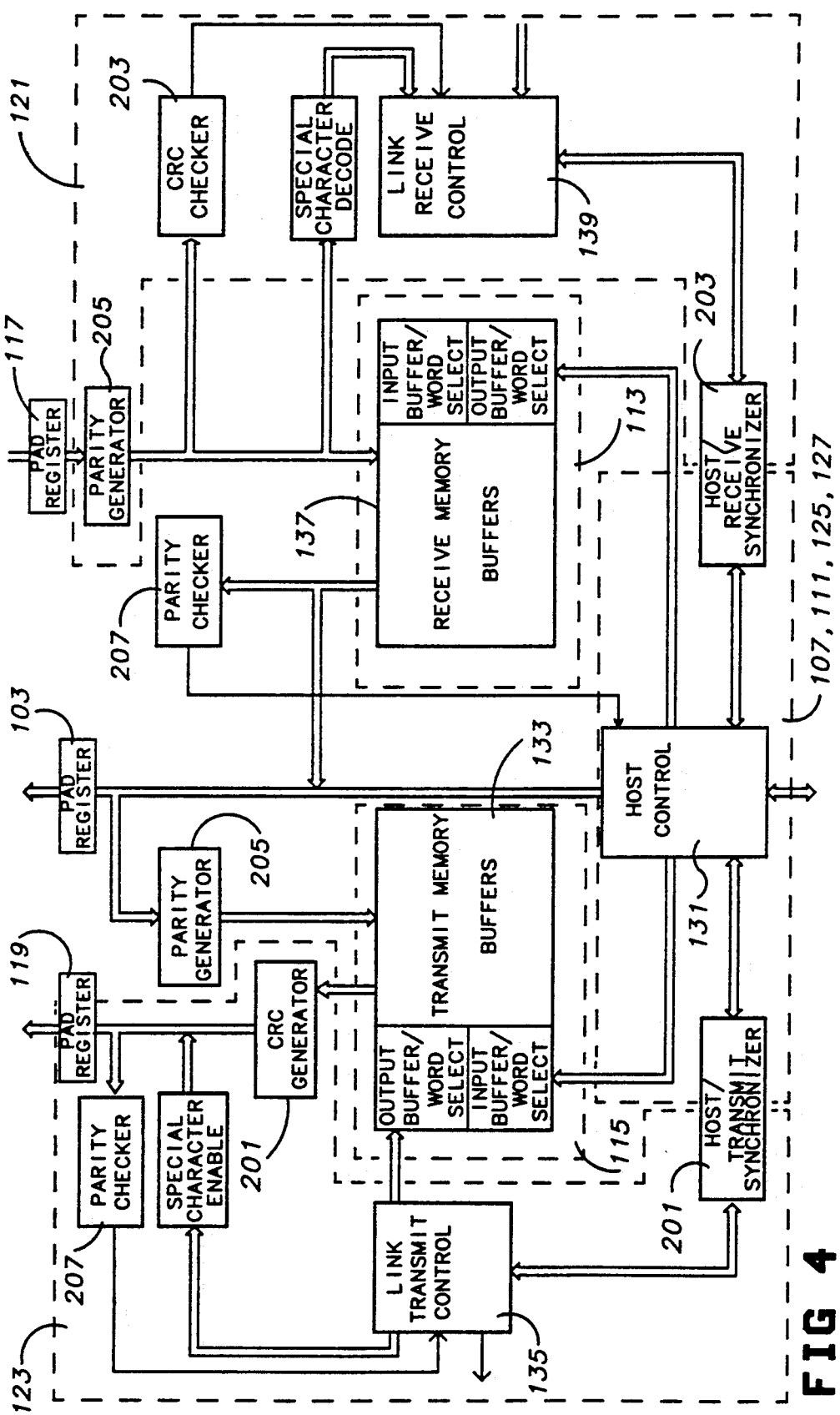
FIG. 4 is a preferred embodiment schematic block diagram of the apparatus of the present invention as shown in FIG. 3 as implemented in a single integrated circuit architecture.

FIG. 4 shows an exemplary, single-chip, LSI integrated circuit block diagram implementation of the above-described device. As will be recognized from the following description of the protocol implemented by the protocol controller 101, the apparatus generally can be thought of as operating as a state machine.

Both the TRANSMIT and RECEIVE sections of the controller 101 have CRC circuitry. The transmit CRC Generator 201 monitors the data stream and maintains a running CRC. A START signal will clear the CRC register at the beginning of each frame. The contents of the upper half of the CRC register is gated onto the data bus during the two clock cycles following the data. These two bytes represent the contents of the CRC register after the last data byte was clocked in.

The receive CRC Checker 203 also maintains a running CRC and is reset at the start of each frame just like the transmit CRC Generator 201. It also maintains a running comparison of received data and the contents of its CRC register during the last two clock cycles. Matching of received CRC and locally computed CRC can thereby be accomplished.

As also shown in FIG. 4, common parity generation and checking 205, 207 is also provided if required by the overall system.

GENERAL DESCRIPTION OF OPERATIONS PERFORMED BY THE APPARATUS

In general, the protocol mechanism of the present invention has several features which provide for improved data transmission.

Reductions are made to the size of the data portion of information packets. The shortening of the length of data within an information packet allows on-chip buffering. This increases link speed by giving faster access to the data.

Discrete bits in the packet headers are used for both information and control packet types. The control packet headers, as shown in FIGS. 5C and 5D, use distinct bits to enumerate the packet type (instead of encoding the bits within each field as shown in FIG. 5B). The independence of the distinct bits also allows the simultaneous sending of several control flags. This reduces the number of control packets sent, thereby increasing link throughput.

Reductions are made in the number of types of packets and the size of their headers. The number of packet types has been reduced to two (from the traditional three). The information packet header size is reduced from two bytes to one byte.

A third state variable, $V_e$, is added to the traditional two, $V_s$ and $V_r$, in the packet header. The addition of $V_e$ allows the transmitting DTE to know how much information it can send without overrunning the receiving DTE.

FIGS. 6 through 9 are flow charts showing the basic state machine control functions performed in the data transformation to and from the protocol format implemented by the present invention.

TRANSMIT MODE

Figure 6A:
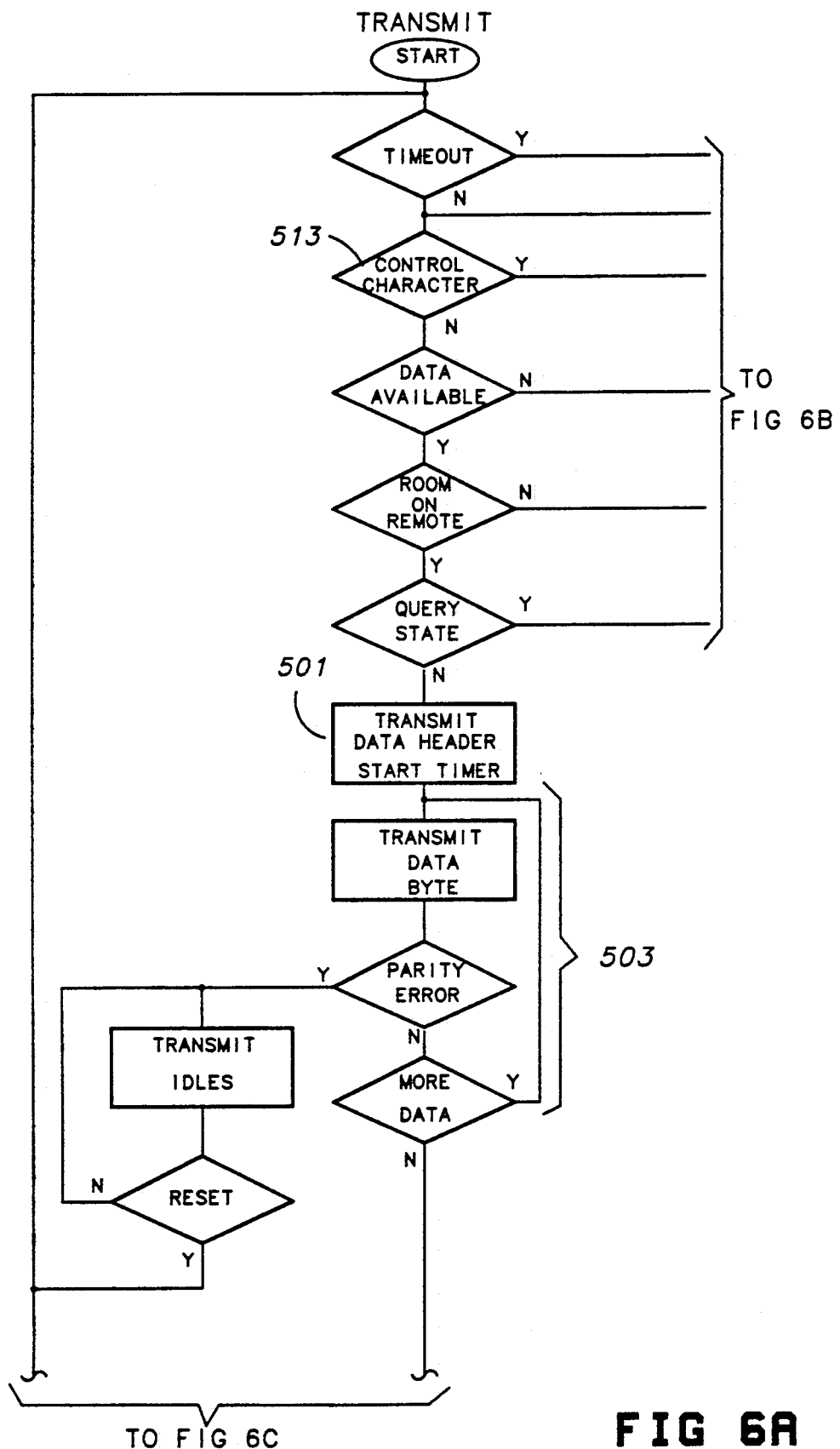
Figure 6C:
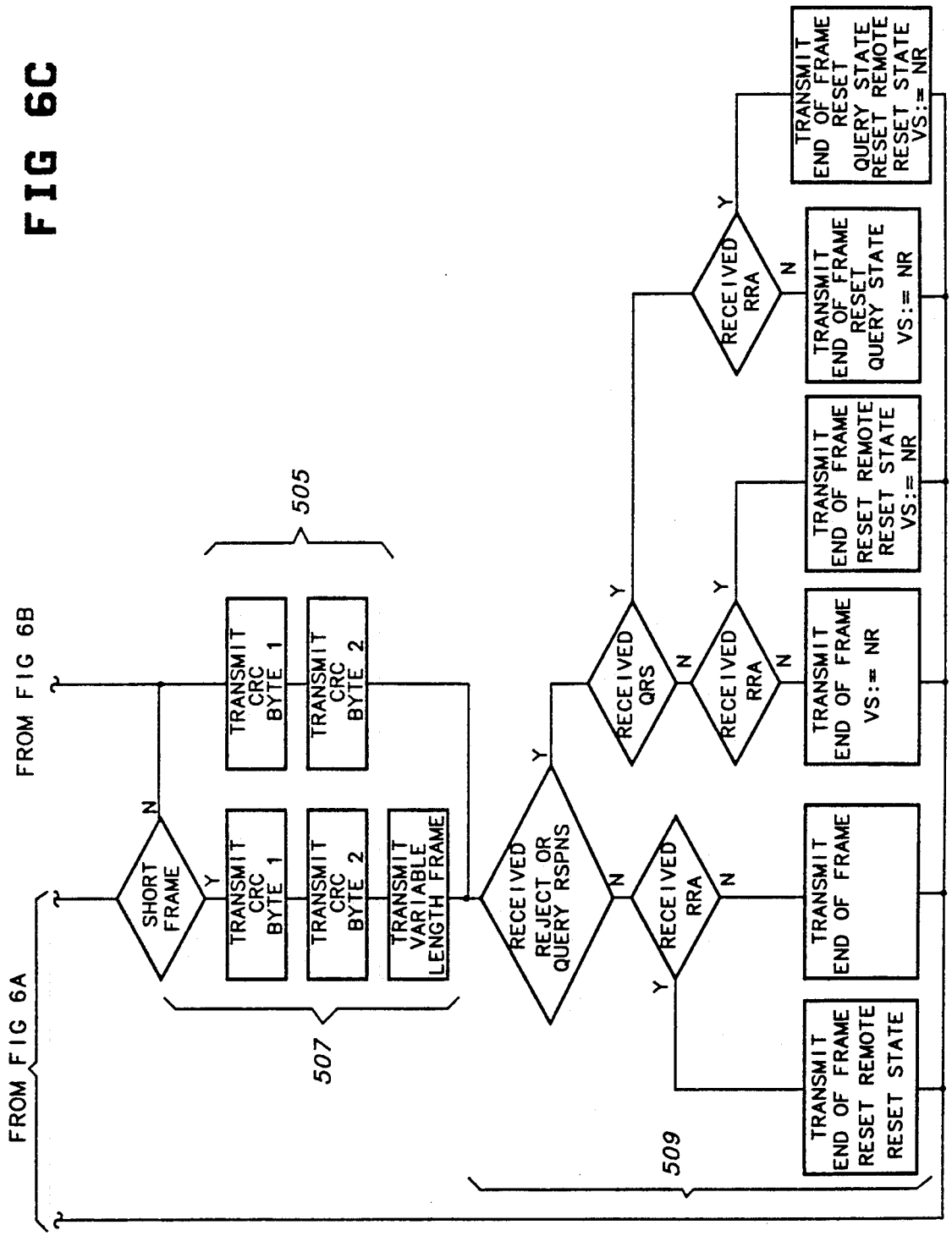

Referring to FIG. 4 and the flow chart in FIGS. 6A–C, operation in the TRANSMIT MODE is defined for the preferred embodiment. It will be recognized by a person skilled in the art that the functions to be performed can be implemented in microcode stored in a programmable logic array (PLA) 131 as shown in FIG. 4. The state variables relationships (in math modulo 8 in the preferred embodiment) are summarized in TABLE 1 above.

Data are loaded into the transmit memory FIFO 133 per the control direction provided by the microcode of the host PLA 131 receive section. A full sixteen byte buffer is loaded unless there is a higher level end-of-segment (EOS) in the Direct Memory Access (DMA) Control Register, indicating a shorter buffer needs to be sent 507. When the buffer 133 has been loaded, the host transmit PLA 131 sets a signal, TX_Full [X], indicating that the buffer is available. The information includes a count indicating how many bytes are valid. The controller 101 will drive a PSC transmit data bus and control with signals generated every transmit clock cycle. The controller 101 will insert a BSC at the beginning of each frame, a CRC after the body of each frame, a VLF after the CRC if necessary to indicate a short data frame, and an EOF at the end of each frame. The controller 101 will drive an IDL signal after a reset and before and after entering a loop back mode and if a parity error is encountered.

A TRANSMIT control PLA 135 sends user information by sending I-FRAMEs. PLA 135 sends control information in C-FRAMEs.

C-FRAME transmission occurs when: there is new control information, there is an outstanding RSN, there is outstanding QRY, there is an outstanding RLR, or an I-FRAME cannot be sent. The TRANSMIT MODE is required to transmit a C-FRAME whenever any of the control flag bits, REJ, QRY, QRS, RSN, RSA, RLR, or RRA are set. These C-FRAMEs have precedence 513 over I-FRAMEs. Since all of the bits which are set are carried with the C-FRAME, only one frame needs to be sent when more than one bit is set. All bits which were transmitted in the control fame are cleared when the frame is sent. When there are no I-FRAMEs ready to send (or the transmit window is closed), C-FRAMEs provide updates to the remote as to the state of the local receiver.

I-FRAME transmission will occur when: there is valid data in the memory to be sent and the transmit window is open and none of the first three reasons for sending a C-FRAME are true.

The link TRANSMIT control PLA 135 transmits the data out of the memory 133 if there is space available at the other end of the link, i.e. whenever the transmit window is open 509. The PLA 135 prefixes data with a header containing the buffer number of the buffer being sent, NS, and the buffer number of the I-FRAME that the local receiver expects to empty next, NE. In the preferred embodiment, the data are followed with a 16-bit CRC used for error detection, and the special character, VLF, if the frame is less than 16-bytes.

In the preferred embodiment, the transmit window is open when the number of outstanding frames is one less than the number of buffers available, or equivalently, when the transmit sequence variable, VS, is not adjacent to the transmit window variable, VW (i.e., VS+1<>VW). This limits the number of outstanding frames, so that the TRANSMIT MODE can recover from errors in transmission. Because the maximum number of outstanding frames is limited to the number of frame buffers minus one, the pointer VS can never overtake VW, thereby eliminating ambiguity of all full or all empty buffers. The send state variable, VS, is incremented whenever a frame is transmitted. The transmitter manages the window state variable, VW, based on the receive and empty sequence numbers, NR and NE, respectively, in the frames received, and may modify VS to cause re-transmission in the case of an error.

IDL transmission occurs: after a RST, before entering or leaving a loopback mode, JLB, after entering or leaving JLB, and when a parity error occurs.

If there is a parity error detected in the output, the transmit state machine will immediately begin transmitting IDLs on the link which will guarantee that the remote end will not interpret the data as valid. At this point, the controller 101 will generate an interrupt to the local microprocessor and will wait for a reset signal before transmitting anymore C-FRAMEs or I-FRAMEs.

To transmit a C-FRAME, the transmit state machine will send: a BSC, the two bytes of control information (control headers), and two bytes of CRC followed by an EOF.

To send an I-FRAME, the transmit state machine sends: a BSC, one byte of header information, the user data, VLF (if there were not sixteen bytes transmitted, and an EOF.

TIMER

The link level protocol requires a timer at each DTE for use in recovering from lost frames. In the preferred embodiment, the timer is fixed in duration at 256-byte times (for a one km link length, speeds to 120 megabaud, and frame sizes up to 16-bytes of data). The timer must be able to be restarted for the full duration or cleared (disabled) at any time. The timer is always left running whenever there are any unacknowledged I-FRAMEs within the transmit window, i.e. whenever VS<>VA, or there is an outstanding QRY or RLR. Expiration of the timer signals the sending of a QRY to the remote DTE to detect lost frames or acknowledge signals or retransmission of QRY or RLR in the event of no response.

The rules for maintaining the transmit timer are as follows: (re)start when: an I-FRAME is transmitted, or a C-FRAME with QRY asserted is transmitted, or a C-FRAME with RLR asserted is transmitted; restart the timer when: one or more I-FRAMEs are acknowledged (VA moves), and after that acknowledgment one or more I-FRAMEs is still outstanding (VA<>VS), and QRY is not outstanding, and RLR is not outstanding; clear the timer when: no I-FRAMEs are outstanding (VA=VS), and a QRY is not outstanding (QS=0), and RLR is not outstanding (RRS=0); and if the timer ever expires: if either QS or RRS are set, send a C-FRAME with corresponding flag bit set and restart the timer; if neither QS or RRS are set, set QS and send a C-FRAME with QRY set and restart the timer Note that the protocol controller 101 thus is providing error control at the Link Layer level in the TRANSMIT MODE. Moreover, the protocol controller 101 of the present invention also provides flow control 511 in the TRANSMIT MODE.

RECEIVE MODE

Figure 7A:
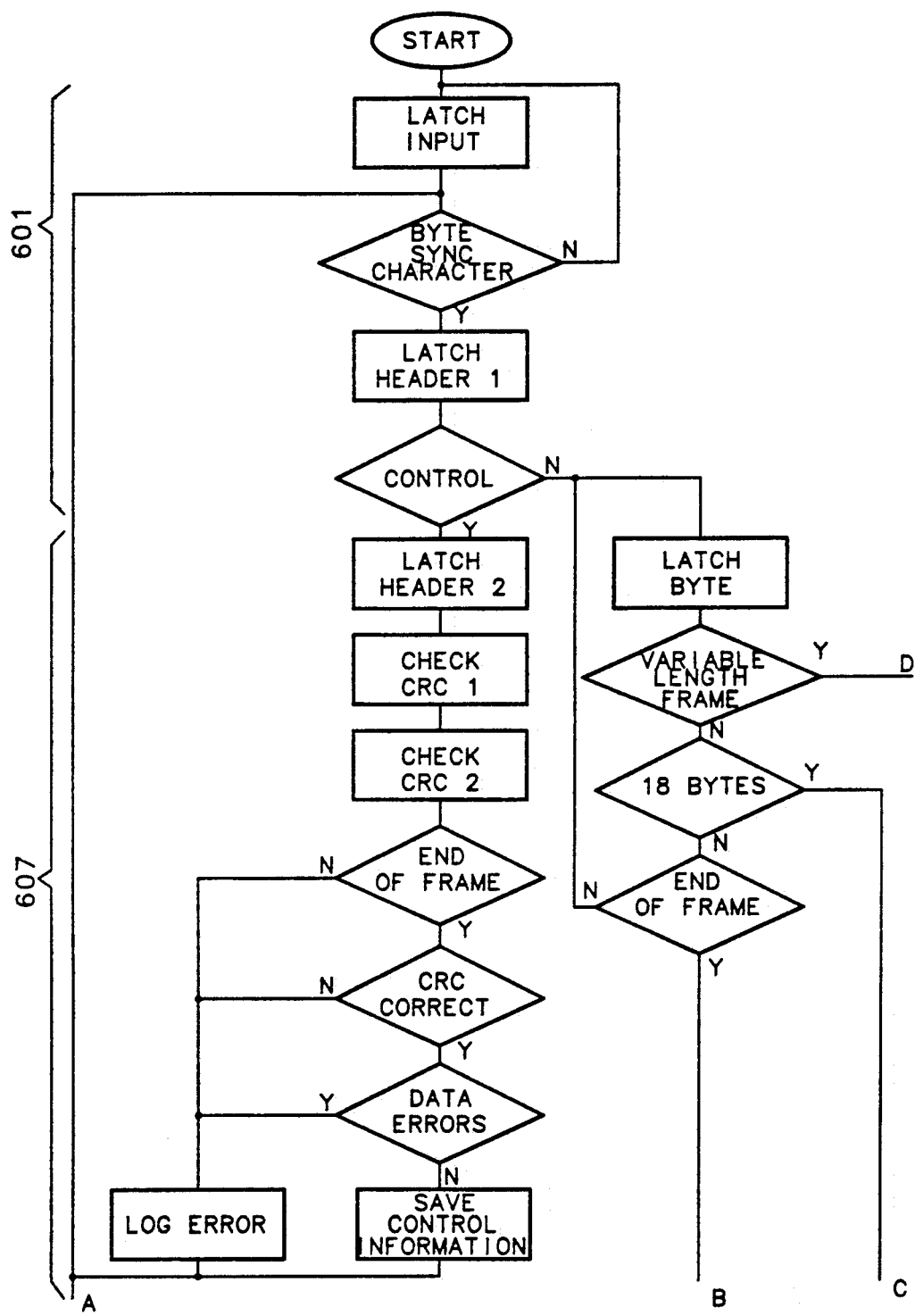
FIG. 7a-7b is a flow chart representation according to the present invention of the state machine for establishing data flow in the RECEIVE mode.
Figure 7B:
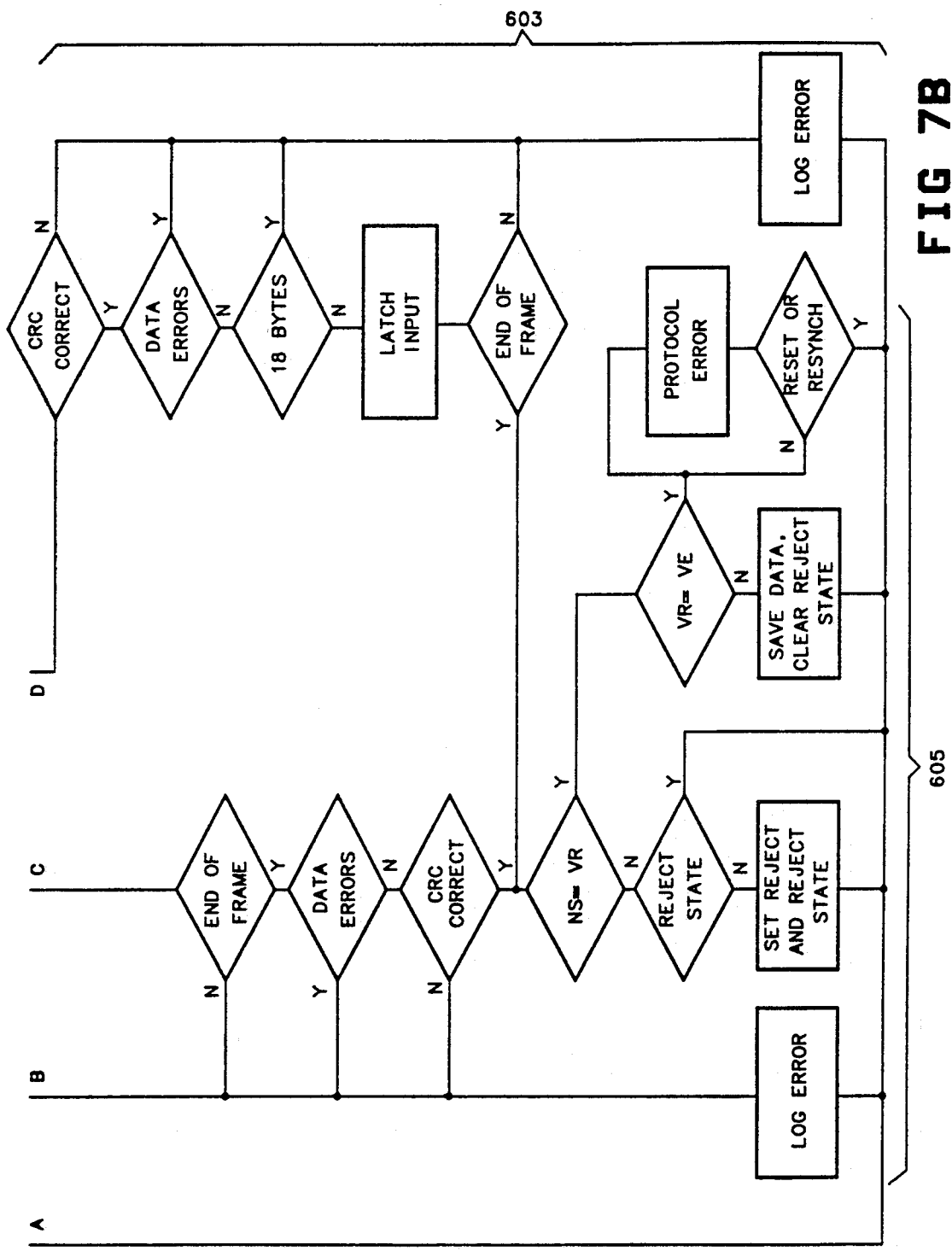

Still referring to FIG. 4, but switching to the flow chart of FIG. 7, the RECEIVE MODE of operation is described.

The RECEIVE MODE is another state machine operation. In general, the receive state machine checks the incoming frames and, if the CRC is correct; the number of bytes is correct; no link errors occurred; and the frame sequence is correct on I-FRAMES, it latches data either in the appropriate register within the link receive control PLA 139 for C-FRAMEs or in the appropriate buffer in memory 137 for I-FRAMEs.

The serial-to-parallel converter receive data bus will be read by the controller 101 every receive clock cycle. The five control bytes (IDL, BSC, CRC, VLF, and EOF) and data will be removed from the body of the frame. If any error bits are set, the data is ignored and an error is logged to a link error counter in the host memory stack.

Data are loaded into a receive memory FIFO 135 under microcode control of the link receive control PLA 139. The most significant bit of the first byte of a received frame informs 601 the protocol controller 101 whether it is an I-FRAME or a C-FRAME. The value of NE which was received in the header is passed to the link transmit control PLA 135 to be used for determining if there is space for data at the other end of the link. This is also only sent if the above three conditions were met.

I-FRAMEs are assembled 605 in the buffer pointed to by VR until an EOF is received from the Physical Layer control. A CRC is computed as the bytes are received, and checked for agreement with the received CRC when the frame ends. In the preferred embodiment, it is intended to detect any two errors on the line in order to achieve a satisfactory rate of undetected errors. In most implementations, the state of the CRC register at any time represents the current remainder. The final state of the CRC register, which is the final remainder, becomes the frame check word (FCW) and is appended to the data. The receiver uses the entire received sequence including the FCW as the dividend. Barring any errors, the remainder at the receiver will be zero because the remainder at the transmitter was used as the FCW. In practice, a slight modification is made to guarantee that the initial and final contents of the CRC register are not equal (to detect missing frame delimiters). The CRC register is initialized to one, the remainder is inverted before transmitting, and the receiver checks for a constant remainder when there are no errors. To simplify the parallel implementation, the preferred embodiment uses a circuit in which the state of the CRC register does not represent the current remainder. The input and output sequences, however, are identical (the same division is performed). Consequently, the FCW is not the remainder, and therefore, the receiver cannot include it in the division. The FCW is merely a "signature" which the receiver recomputes and verifies. In this implementation the initial and final contents of the CRC register are not equal so that the absence of a frame delimiter will be detected.

Frames with bad CRC's or frames which exceed sixteen bytes of data or frames which have a link error associated with them are discarded. I-FRAMEs that are received correctly are checked for sequence errors by comparing the value of VR with the NS field in the frame's header. If they do not match and the reject state bit (RJS) is not set, the REJ flag is set and will cause the transmitter to send a reject frame back to the remote DTE; RJS is also set, and no further reject frames are sent until after a frame is received in sequence (which clears RJS).

Frames that are good and in sequence are made available to the host receive controller 131. The RX_FULL (Vr) bit is set for a filled buffer to allow the receive DMA to empty the buffer. The length of the frame, counted as bytes were received, is stored in the RX_CNTR for that buffer and VR is incremented.

Figure 8A:
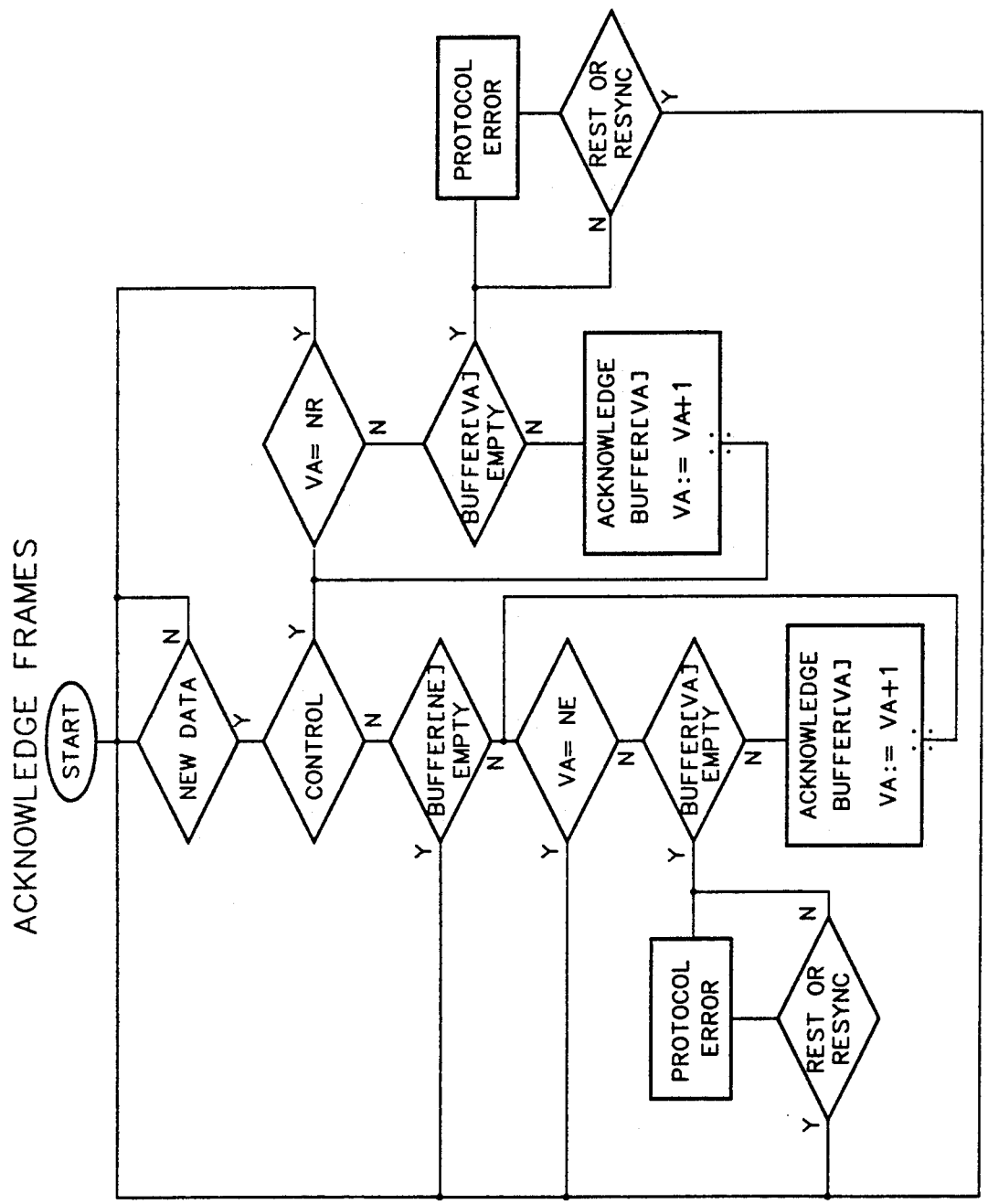
FIG. 8a is a flow chart representation according to the present invention of the state machine for ACKNOWLEDGE data frames.
Figure 8B:
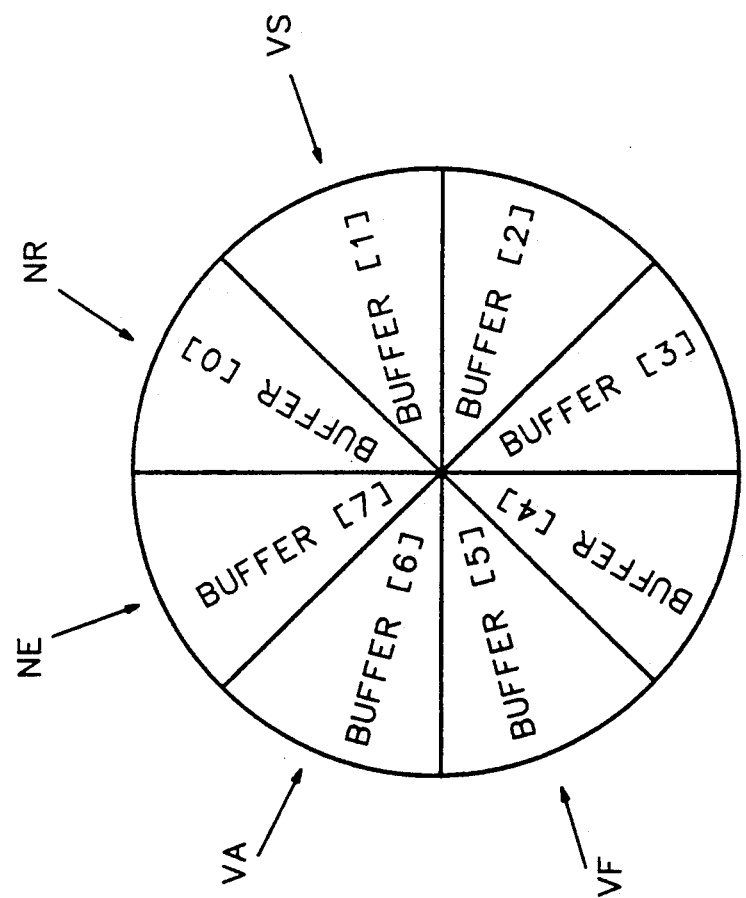
Figure 9C:
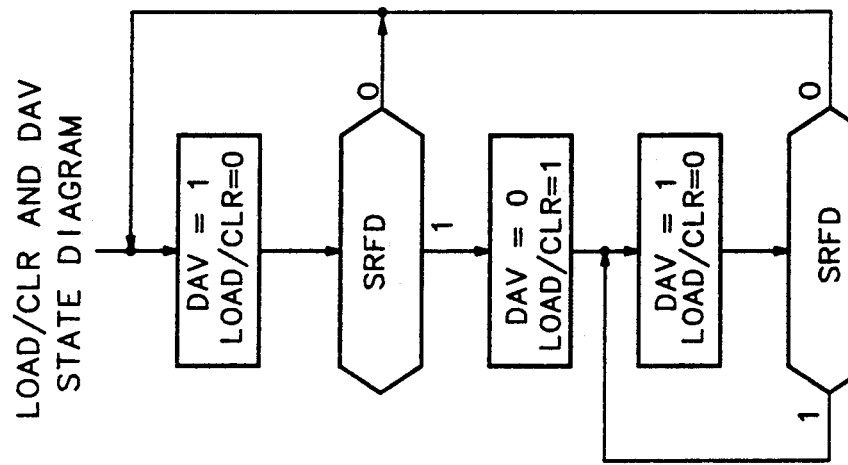
FIGS. 9a, 9b and 9c are flow charts according to the present invention of the state machine for establishing internal synchronization conditions.
Figure 9B:
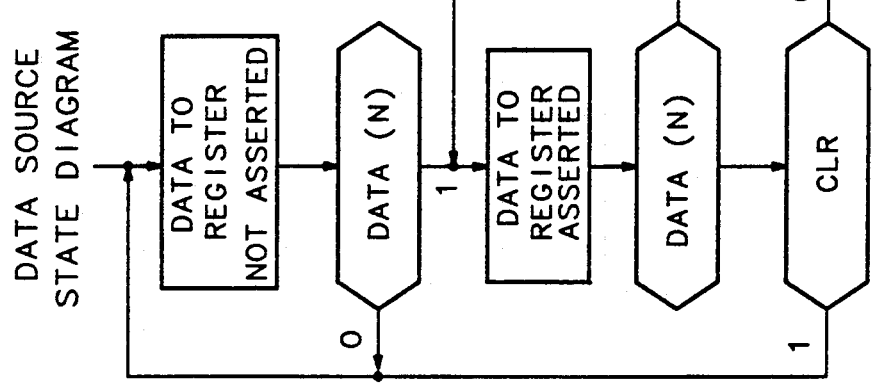
Figure 9A:
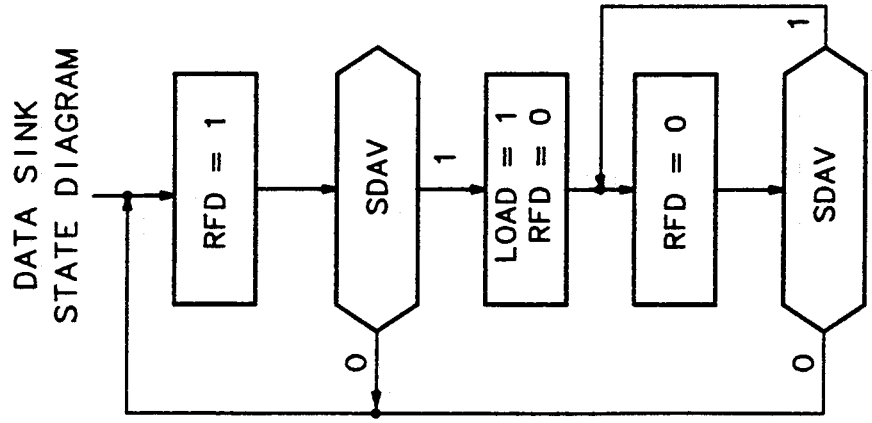

The value of NE in the received I-FRAME header can be used to acknowledge outstanding frames as demonstrated in FIGS. 8A and 8B, such as when data are being sent in both directions at the same time. Since I-FRAMEs have precedence over C-FRAMEs unless a control flag bit is set, the only indication that data have been received correctly at the remote DTE is the advancement of NE. NE moves as frames are removed from the remote DTE, so it is implied that the data was received correctly and, therefore, can be acknowledged. Thus, if NE passes VA, those frames numbered VA through NE-1 are acknowledged, and VA is set equal to NE. If any frames remain unacknowledged, the transmit timer is restarted. If no unacknowledged frames remain, the transmit timer is cleared. If no frames were acknowledged (NE< =VA), the timer is left unchanged. In all cases, the window state variable VW is updated to the value of NE.

Referring back to FIG. 8, the protocol controller 101 also processes 607 incoming C-FRAMEs, thereby providing RECEIVE MODE flow control and error recovery at the Link Layer level.

C-FRAMEs are disassembled into two 8-bit latches, CL1 and CL2. If the CRC computed as the frame was received is not equal to the received CRC, or if there were link errors associated with the frame, the frame is discarded without further action. If the CRC matches, the functions indicated by the various bits in the latches are executed as follows:

| | |
|---|---|
| CL1.REJ | SET VS = NR. |
| CL1.QRY | SET QRS TRANSMIT FLAG. |
| CL1.QRS | CLEAR QS, SET VS = NR. |
| CL1.RLR | PULSE RLR PIN ON CHIP, SET RRA TRANSMIT FLAG. |
| CL2.RSN | SET RSS STATE, INTERRUPT MICROPROCESSOR. |
| CL2.RRA | CLEAR RRS. |
| CL2.RSA | CLEAR RSS, INTERRUPT MICROPROCESSOR. |

Outstanding I-FRAMEs from the transmitter DTE are acknowledged based on the NR field in CL2 in the same manner as was done for NE for I-FRAMEs. The window state variable, VW, is set to NE in CL1. The receipt of any frame which attempts to acknowledge a previously acknowledged frame causes the RSN flag to be set. Since this condition cannot be corrected by retransmitting the frame, the data transfer must be aborted, and the link re-synchronized.

C-FRAMEs that are received with a data part are discarded. It is assumed that a byte framing error occurred. The same procedure is followed as with a CRC error.

SYNCHRONIZATION AND RE-SYNCHRONIZATION

In order for two DTE's to communicate successfully, they must be synchronized.

Re-synchronization occurs on power-up or any time that two protocol controllers 101 get out of sync during operation.

During re-synchronization, the state variables of the receiving DTE protocol controller 101 are synchronized with those of the transmitting DTE protocol controller 101. Sending a C-FRAME with the RSN bit set causes the receiving DTE to set RSS and clear all counters and flags. Receiving RSN or RSA causes an interrupt to be sent to the microprocessor. Sending or receiving RSA clears RSS. While RSS is set, any received I-FRAME is discarded, and received C-

FRAMEs are only processed for RSN, RSA, RLR, and RRA.

REMOTE LINK RESET (RLR) FUNCTION

The RLR function provides a low level signalling capability across a link and can be used when normal data communication does not seem to be working. The intent is that this signal be used to reset the remote DTE.

The transmitting DTE asserts RLR in a C-FRAME sent to the remote DTE. The remote protocol controller 101 acknowledges receipt of the RLR by returning an RRA frame and then sends a pulse to the RLR pin on the receiving protocol controller 101. This dedicated pin can be sensed by whatever circuitry may need to be reset. The pulse on the RLR pin is delayed until after the RRA is sent, in case the reset affects the protocol controller itself. The RLR pin will be de-asserted if the protocol controller 101 is reset.

EXAMPLE OF DATA FLOW

The following TABLE II shows an example of a data transfer showing the interaction of the various state variables in controlling flow, and recovering from link errors. Note that only one half-duplex channel is shown. Since the protocol is symmetrical, the operation for the reverse channel is the same. Some of the sequences of actions (e.g., sending of frames and the transfer of information to the hosts, have been stretched to better show the operation of the transmit window, timer, and rejecting of out of sequence frames.

TABLE II

|    | Transmit Side VW | VA | VS | Receive Side | VR | VE |
|----|----|----|----|----|----|----|
| 1  | 0  | 0  | 0  |  | 0 | 0 |
| 2  |    |    |    | — I frame, VS = 0 → ok |  |  |
| 3  | 0  | 0  | 1  |  | 1 | 0 |
| 4  |    |    |    | — I Frame, VS = 1 → ok |  |  |
| 5  | 0  | 0  | 2  |  | 2 | 0 |
| 6  |    |    |    | ← C frame, VR = 2, VE = 0 — |  |  |
| 7  | 0  | 2  | 2  | (acknowledges frames 0,1, no window change) | 2 | 0 |
| 8  |    |    |    | — I frame, VS = 2 → ok |  |  |
| 9  | 0  | 2  | 3  |  | 3 | 0 |
|    |    |    |    | . . . etc. . . |  |  |
| 10 |    |    |    | — I frame, VS = 6 → ok |  |  |
| 11 | 0  | 2  | 7  |  | 7 | 0 |
|    |    |    |    | window is now closed. |  |  |
| 12 |    |    |    | frame 0 xfer to host |  |  |
|    |    |    |    |  | 7 | 1 |
| 13 |    |    |    | ← C frame, VR = 7, VE = 1 — |  |  |
| 14 | 1  | 7  | 7  | (acknowledges frames 2–6, opens window) |  |  |
| 15 |    |    |    | — I frame, VS = 7 — *hit* → | CRC bad |  |
| 16 | 1  | 7  | 0  | window is closed | 7 | 1 |
| 17 |    |    |    | timer expires |  |  |
| 18 | 1  | 7  | 0  | — C frame (Query) → |  |  |
| 19 | 1  | 7  | 0  |  | 7 | 1 |
| 20 |    |    |    | ← C frame (Q Res) VR=7, VE=1 — |  |  |
| 21 | 1  | 7  | 7  | (VS adjusted, window open) | 7 | 1 |
| 22 |    |    |    | — I frame (re-tx) VS = 7 → ok |  |  |
| 23 | 1  | 7  | 0  | window is closed | 0 | 1 |
| 24 |    |    |    | frames 1 - 5 xfer to host |  |  |
|    |    |    |    |  | 0 | 6 |
| 25 |    |    |    | ← C frame, VR = 0, VE = 6 — |  |  |
| 26 | 6  | 0  | 0  | (acknowledges frame 7, opens window) | 6 | 0 |
| 27 |    |    |    | — I frame, VS = 0 — *hit* — | CRC bad |  |
| 28 | 6  | 0  | 1  |  | 0 | 6 |
| 29 |    |    |    | — I frame, VS = VS = 1 → | CRC ok, sequence error; Discard frame and set REJ, RJS to 1 |  |
| 30 | 6  | 0  | 2  |  |  |  |
| 31 |    |    |    | — I frame, VS = 2 → | sequence error, discard frame |  |
| 32 | 6  | 0  | 3  | >> simultaneously << |  |  |
| 33 |    |    |    | ← C frame (Reject) VR=0, VE=6 — | 0 | 6 |
| 34 | 6  | 0  | 0  | VS updated, window still open |  |  |
| 35 |    |    |    | — I frame re-transmit VS=0 → ok, clear RJS |  |  |
|    |    |    |    |  | 1 | 6 |
| 36 | 6  | 4  | 1  |  |  |  |
| 37 |    |    |    | — I frame, VS = 1 → ok |  |  |
| 38 | 6  | 4  | 2  |  | 2 | 6 |
|    |    |    |    | . . . etc. . . |  |  |

The example of TABLE II shows that after a RSN, all pointers are set to zero (1). When the transmitter transmits frame zero (2), it updates VS to one and, when the frame is received properly, the remote updates VR to one (3). The same happens for frame one (4,5).

The remote then returns a C-FRAME (6), indicating the new value of VR which acknowledges frames zero and one and moves VS to two (7). In this step, the window is not changed since the remote did not change VE.

Frames two through six are sent and received properly (8-10). The window is closed because the remote has seven outstanding frames (11).

After the remote has frame zero read by it's host DTE (12), it returns a C-FRAME with VR=7 and VE=1 (13). This acknowledges frames two through six and opens the window for one more frame (14).

Frame seven is then transmitted but has an error in transmission (15). The fact that frame seven was transmitted closes the window (16). But, since there was an error in this part of the example, there will not be an acknowledge. The transmitter timer will expire (17), causing a QRY to be transmitted (18). The QRS from the remote will indicate that the next frame expected is frame seven (20). The local device will then reset VS to seven and retransmit frame seven (21, 22). The window is then closed (23). Frames one through five are then read by the remote host DTE (24). A C-FRAME with VR=0 and VE=6 is sent by the remote (25). This acknowledges frame seven and opens the window (26).

Frame zero is then transmitted and an exemplary error is assumed to occur during its receipt (27). This means that VS is updated but VR is not (28). Frame one is then sent with no error (29). VS is again updated (30). The remote detects a good frame but out of sequence. It discards the frame and sets a reject state and sends REJ (30). Frame two is then transmitted at the same time as the REJ is sent from the remote (31-33). Frame two is discarded due to being out of sequence (31). When the REJ is received, the local resets VS=0 as indicated by the REJ (34) and begins by retransmitting frame zero (35). When frame zero is received correctly, the reject state of the remote is cleared and normal operation is resumed (36-38).

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A method for controlling data transmission using an open systems interconnection model, comprising:
   providing link layer sliding window protocol formatting of information to be transmitted such that said protocol provides transmission flow control.

2. A method as in claim 1 wherein
   information is transmitted from a transmitter to a receiver and is transferred from the receiver to a host, and,
   the link layer sliding window protocol includes control frames sent from the receiver to the transmitter, the control frames including a first state variable indicating a first frame of information to be next transferred from the receiver to the host and the control frames including a second state variable indicating a second frame of information to be next transmitted from the transmitter to the receiver.

3. A method for controlling data transmission comprising:
   providing a transparent indicator within control information in a control frame from a transmitting node network controller to a receiving node network controller which is substantially compatible with the transmitting node network controller, the transparent indicator being transmitted independent of the flow of data and the transmission of the transparent indicator providing a reliable signalling capability from the transmitting node network controller to the receiving node network controller;
   wherein upon receipt of the transparent indicator, data transmission state variables within the receiving node network controller are not altered.

4. The method as set forth in claim 3 additionally comprising:
   providing, from the receiving node network controller to the transmitting node network controller, a reply indicator which will acknowledge the receipt of said transparent indicator;
   wherein upon receipt of the reply indicator, data transmission state variables within the transmitting node network controller are not altered.

5. A method for controlling data transmission using an open systems interconnection model, comprising:
   providing link layer sliding window protocol formatting of information to be transmitted such that said protocol provides transmission flow control by providing state variable information which identifies a next receiving node substantially compatible link layer protocol controller buffer to be emptied.

6. The method as set forth in claim 5, wherein providing state variable information includes:
   providing a state variable in said state variable information which prevents a transmitting node link layer protocol controller from over-running a receiving node substantially compatible link layer protocol controller input buffer by indicating the receiving node input buffer status to the transmitting node; and
   incrementing said state variable when the receiving node input buffer has been emptied into the receiving node data terminal equipment.

7. The method as set forth in claim 6, wherein providing state variable information further includes:
   providing sliding window error control if there is continuous bidirectional information traffic on the link by said receiving node complementary link layer protocol controller incrementing said state variable to implicitly acknowledge correct receipt of information frames by said receiving node.

8. In data communication equipment, a protocol controller device coupling a first input/output means, for coupling said device to a local data terminal equipment, to a second input/output means, for coupling said device and, therefore, said local data terminal equipment to a communication link, comprising:
   first porting means for transferring information in to and out from said first input/output means;
   second porting means for transferring said information to and from said second input/output means;
   switching means coupled to said first porting means for controlling an input/output information transfer path through said first porting means;
   information holding means, coupled to said first porting means and to said second porting means, for pipelining said information through said device;
   controlling means (121, 123) coupled to said holding means and said second porting means, for protocol formatting of said information, and;

at least one control means for controlling access to said controlling means and transferring said information to and from said controlling means from said first input/out means; and at least one device porting means for coupling said holding means to said first input/output means.

9. The device as set forth in claim 8, wherein said second porting means comprises:

transmit porting means for transferring said information to said second input/output means; and receive porting means for transferring said information from said second input/output means.

10. The device as set forth in claim 9, wherein said switching means, control porting means and device porting means further comprises:

first programmable means, coupled to said first input/output means and said information holding means, and programmed for providing said controlling functions; and first synchronizer means, coupling said first programmable means to said transmit porting means, for synchronizing said first input/output means clock domain and said second input/output means clock domain; and second synchronizer means, coupling said first programmable means to said receive porting means, for synchronizing said second porting means input clock domain to said first input/output means clock domain.

11. The device set forth in claim 10, wherein said transmit porting means further comprises:

second programmable means, coupling said information holding means to said second input/output means.

12. The device as set forth in claim 11, wherein said receive porting means further comprises:

third programmable means, coupling said information holding means to said second input/output means.

* * * * *